United States Patent [19]

Chang

[11] Patent Number: 5,129,245
[45] Date of Patent: Jul. 14, 1992

[54] TELESCOPIC STEERING LOCK

[76] Inventor: Peter J. H. Chang, 3F-1, No. 99, Sec. 2, Chungshan N. Rd., Taipei, Taiwan

[21] Appl. No.: 743,643

[22] Filed: Aug. 12, 1991

[51] Int. Cl.⁵ .................. E05B 13/10; B60R 25/02
[52] U.S. Cl. ........................................ 70/209; 70/211
[58] Field of Search ............... 70/209, 211, 212, 225, 70/226, 237

[56] References Cited

U.S. PATENT DOCUMENTS

| | | | |
|---|---|---|---|
| 1,429,334 | 9/1922 | Furber | 70/209 |
| 1,448,658 | 3/1923 | Furber | 70/211 |
| 4,444,030 | 4/1984 | Dausch | 70/209 |
| 4,829,797 | 5/1989 | Wu | 70/209 |
| 4,882,920 | 11/1989 | Wu | 70/209 |
| 5,014,529 | 5/1991 | Wu | 70/209 |
| 5,055,823 | 10/1991 | Fuller | 70/209 |

Primary Examiner—Renee S. Luebke
Assistant Examiner—D. M. Boucher
Attorney, Agent, or Firm—Varndell Legal Group

[57] ABSTRACT

A telescopic steering lock, comprising an elongated casing having a lock barrel set therein and driven to rotate by a driving bar, wherein said driving bar is set inside said lock barrel to reduce space occupation when not in use, or extended out of said casing to drive said lock barrel into a locking position; said casing has an elongated opening in longitudinal direction for mounting on the peripheral ring portion of a motor vehicle's steering wheel and a lock cylinder controlled by a key to lock said lock barrel in a locking position; said lock barrel has a tongue driven to hook in the peripheral ring portion of the motor vehicle's steering wheel into which said elongated opening is engaged.

3 Claims, 7 Drawing Sheets

TELESCOPIC STEERING LOCK

BACKGROUND OF THE INVENTION

The present invention relates to steering locks and relates more particularly to a telescopic steering lock for locking the steering wheel of a motor vehicle in position, which can be collapsed to reduce space occupation when it is not in use.

Various types of locking devices have been disclosed for use to lock a motor vehicle's steering wheel. There is a known structure of steering lock which comprises an elongated locking bar which has two opposite ends respectively fastened to a motor vehicle's steering wheel and brake pedal, when in use, and then locked in position. Disadvantage of this structure of steering lock is its complicated structure which makes locking procedure complicated. Further, it occupies much space when it is not in use. There is still another structure of steering lock which is to be fastened in a motor vehicle's steering wheel at the top at two opposite locations and then, locked in position to prohibit the steering wheel from being rotated. Disadvantage of this structure of steering lock is that it is not suitable for locking the steering wheel which is equipped with an air bag. FIG. 1 illustrates still another structure of steering lock according to the prior art. This structure of steering lock may be suitable for locking a steering wheel which is equipped with an air bag. However, this structure of steering lock is not collapsible and occupies much space when it is not in use. When in use, the locking mechanism must be attached to the peripheral ring portion of a motor vehicle's steering wheel at the correct angle or it will be difficult to lock in position. Further, a key must be used either during locking or unlocking operation.

SUMMARY OF THE INVENTION

The present invention has been accomplished under the circumstances in view. It is therefore an object of the present invention to provide a telescopic steering lock which is suitable for locking any of a variety of steering wheels.

It is another object of the present invention to provide a telescopic steering lock which can be collapsed to greatly reduce space occupation when it is not in use.

It is still another object of the present invention to provide a telescopic steering lock which is convenient in use and can be locked in position without the use of a key.

DETAILED DESCRIPTION OF THE PREFERRED EMBODIMENT

Figure 1:
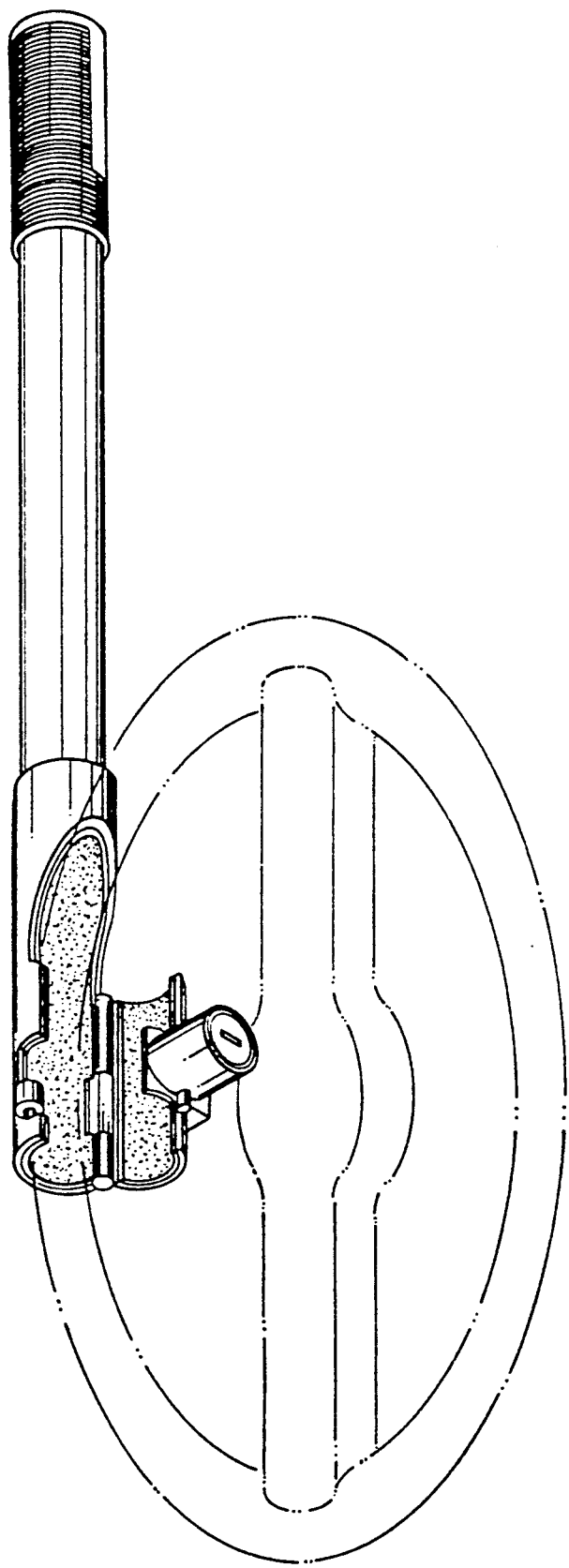
FIG. 1 illustrates a steering lock according to the prior art.
Figure 2:
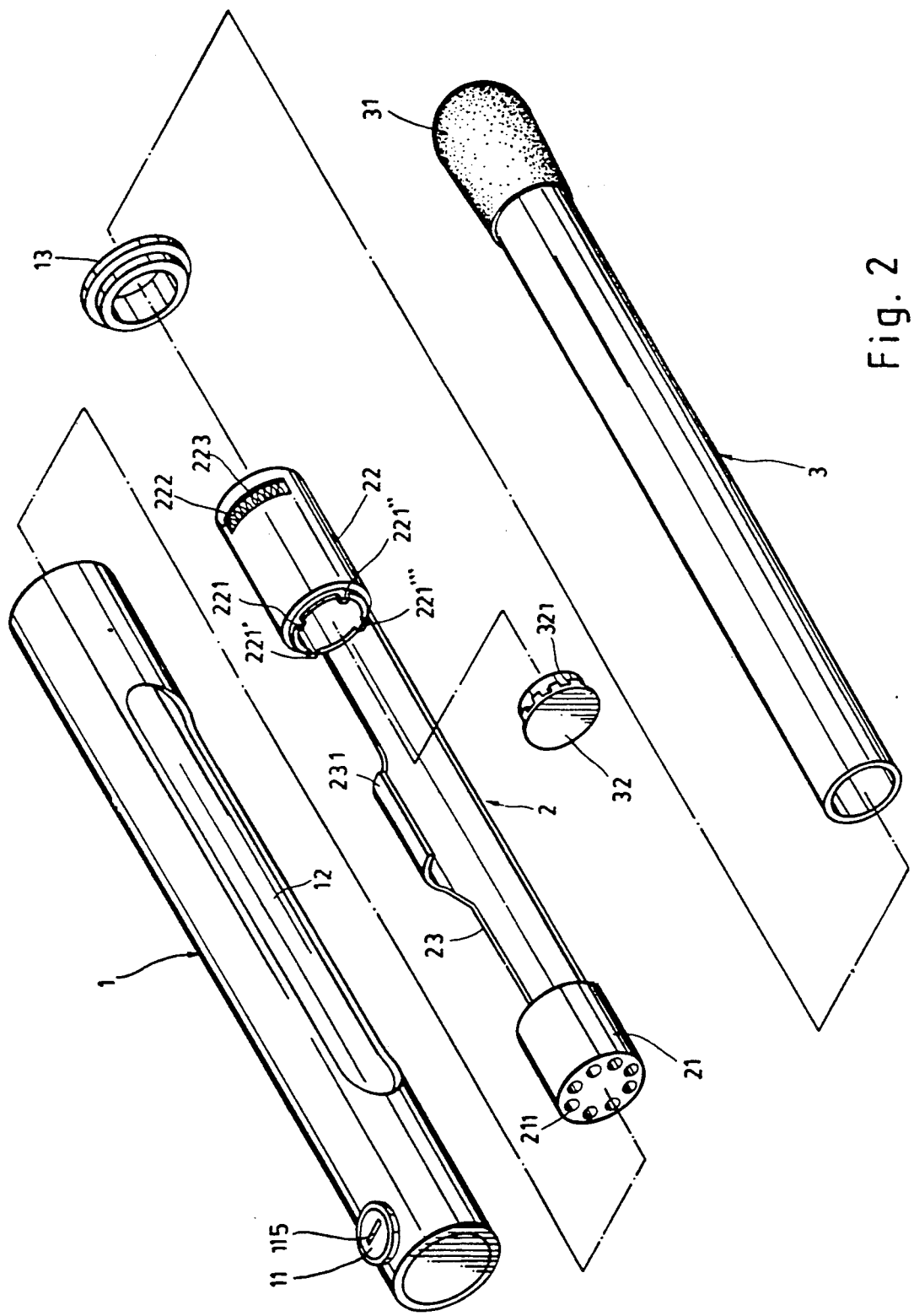
FIG. 2 is an exploded perspective view of the preferred embodiment of the steering lock of the present invention.
Figure 3:
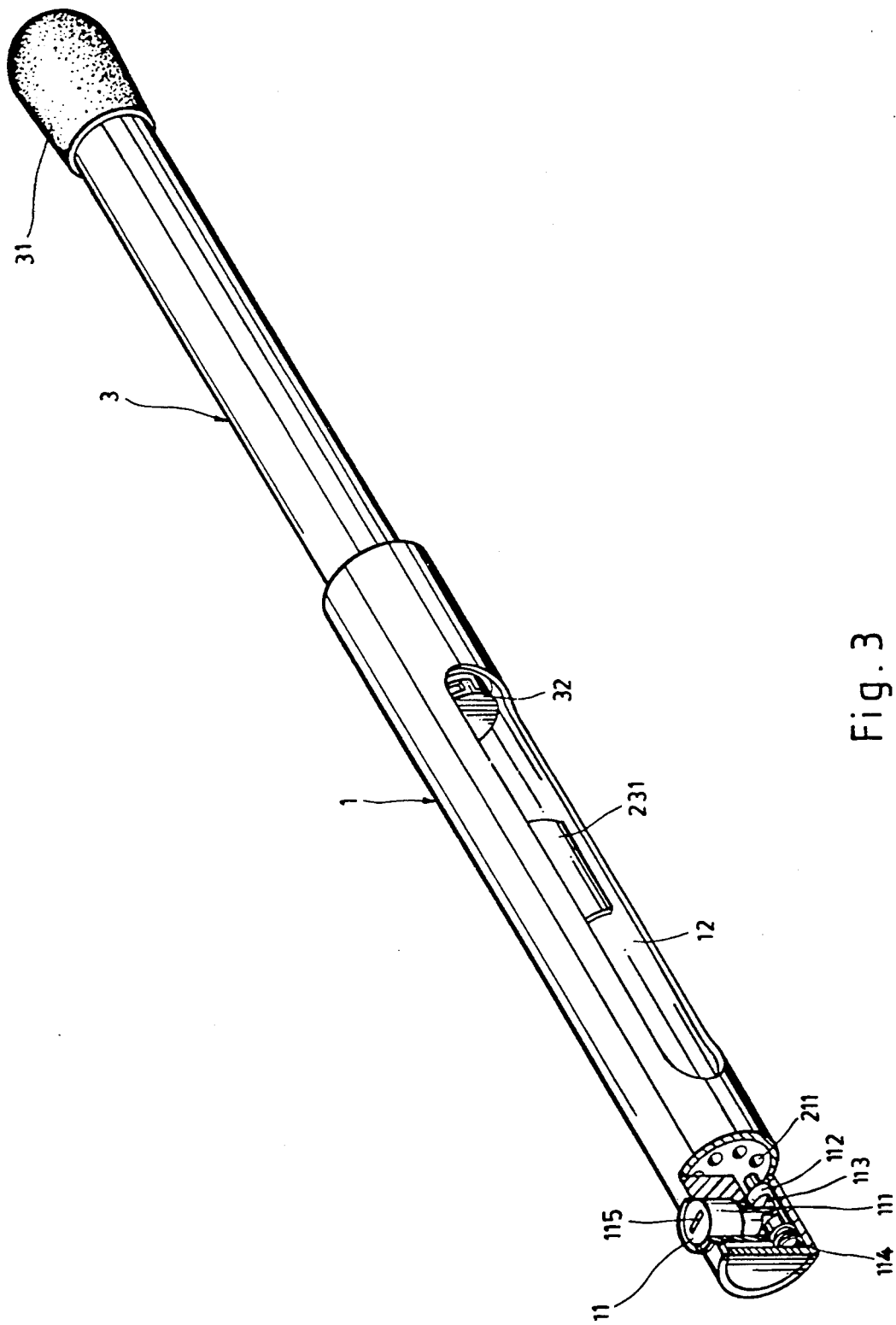
FIG. 3 is an assembly and partly sectional view of the steering lock of the present invention.

Referring to FIGS. 2 and 3, therein illustrated is a telescopic steering lock constructed in accordance with the present invention which is generally comprised of casing 1, a lock barrel 2 and a driving bar 3. The lock barrel 2 is fastened inside the casing 1 to receive the driving bar 3 permitting it to be drawn out and then pushed back into place. The casing 1 is made from a tube having a closed end and an opened end. A lock cylinder 11 is fastened in the casing 1 near the closed end thereof. The casing 1 further has an elongated opening 12 made on the outer wall thereof in longitudinal direction. The lock barrel 2 comprises two cylindrical portions, namely, a front cylindrical portion 21 and a rear cylindrical portion 22 longitudinally disposed at two opposite ends, and a curved, elongated side wall portion 23 connected therebetween. The front cylindrical portion 21 has a plurality of round holes 211 on the end wall surface thereof around the periphery. The rear cylindrical portion 22 has a boring bore hole through the axis thereof for inserting the driving bar 3, a plurality of teeth 221, 221', 221'', 221''' longitudinally disposed at one end adjacent to the side wall portion 23, and an elongated groove 222 on the outer wall thereof in a radial direction with a return spring 223 set therein (which return spring 223 has one end fixedly fastened in the elongated groove 222). The side wall portion 23 is connected between the front and rear cylindrical portions 21 and 22, having a curved tongue 231 extending therefrom at one side in radial direction. The curvature of the curved tongue 231 is made equal to the elongated side wall portion 23. The driving bar 3 is made from a hollow tube having one end inserted inside the lock barrel 2 and an opposite end disposed outside the lock barrel 2 and coupled with a know 31 for comfortable and positive grip.

During the assembly process, the driving bar 3 is inserted through a socket 13 into the rear cylindrical portion 22 of the lock barrel 2 and fixedly coupled with a cap 32 which has a plurality of teeth 321 projecting inwards around the periphery thereof. Drawing the driving bar 3 out of the lock barrel 2 causes the teeth 321 on the cap 32 to engage with the teeth 221, 221', 221'' and 221''' on the rear cylindrical portion 22 and therefore, the driving bar 3 does not disconnect from the lock barrel 2. Once the cap 32 and the rear cylindrical portion 22 are engaged together, the lock barrel 2 can be rotated through the driving bar 3. After the driving bar 3 and the lock barrel 2 have been connected together, the lock barrel 2 is inserted inside the casing 1 and then, the socket 13 is firmly fastened in the casing 1 at the open end thereof to secure the lock barrel 2 inside the casing 1. Then, the opposite end of the return spring 223 in the inner wall surface of the casing 1 is firmly secured. Under normal conditions, the lock barrel 2 is retained inside the casing 1 at such a position that the side wall portion 23 and the curved tongue 231 are moved out of the elongated opening 12.

Figure 6:
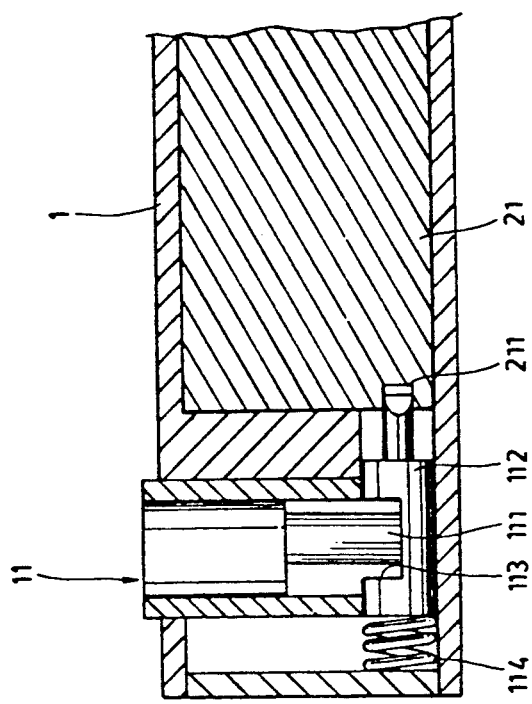
FIG. 6 is a sectional view of the lock cylinder of the casing of the steering lock of the present invention.
Figure 7:
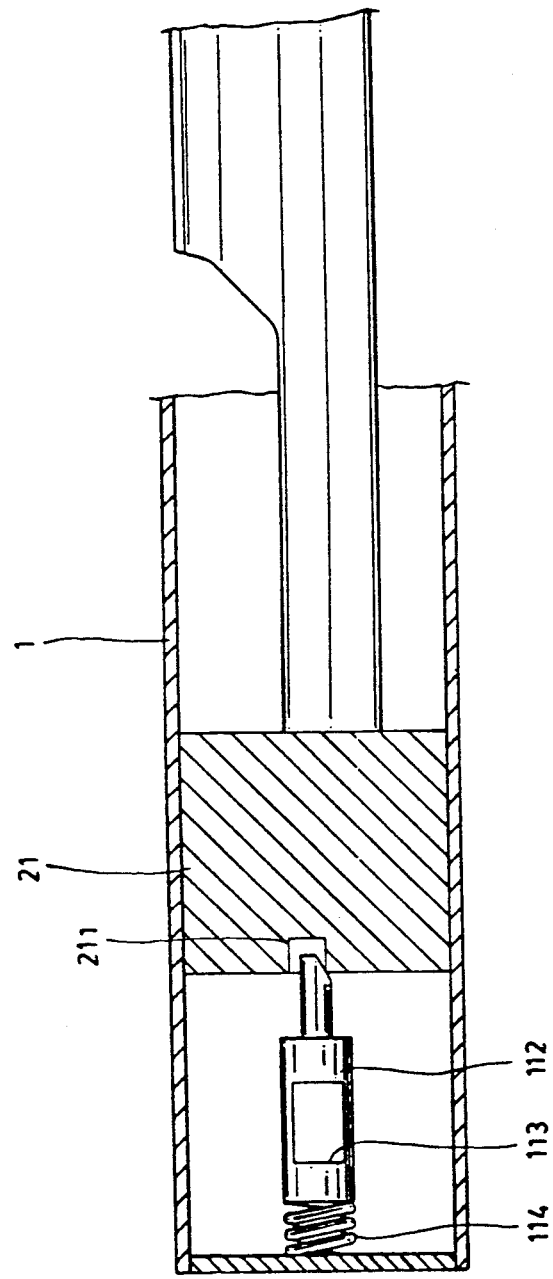
FIG. 7 is another sectional view of the lock cylinder in the casing of the steering lock of the present invention taken through another direction.

Referring to FIG. 3 again, the lock cylinder 11 has a spindle 111 linked to a keyway 115 and inserted in a notch 113 on a bolt 112 which is longitudinally secured to the closed end of the casing 1 at the inside by a compression spring 114 and has a sloping end inserted in either round hole 211 on the front cylindrical portion 21 of the lock barrel 2. The design of the sloping end on the bolt 112 permits the lock barrel 2 to be rotated into a locking position and prohibits the lock barrel from reverse rotation once the lock is locked (see FIGS. 6 and 7). When a key (not shown) is inserted in the keyway 115 on the lock cylinder 11 and rotated, the spindle 111 is simultaneously rotated to move one vertical side wall on the notch 113, causing the sloping end of the bolt 112 to move out of the round holes 221. Therefore, the lock barrel 2 is released from the constraint of the bolt 112 notch 113 and the return spring 223 immediately drives the lock barrel 2 to move back to original position. Once the key is removed from the keyway, the compression spring 114 automatically pushes the bolt 112 to insert in a round hole 221 on the front cylindrical portion 21 of the lock barrel 2.

Figure 4:
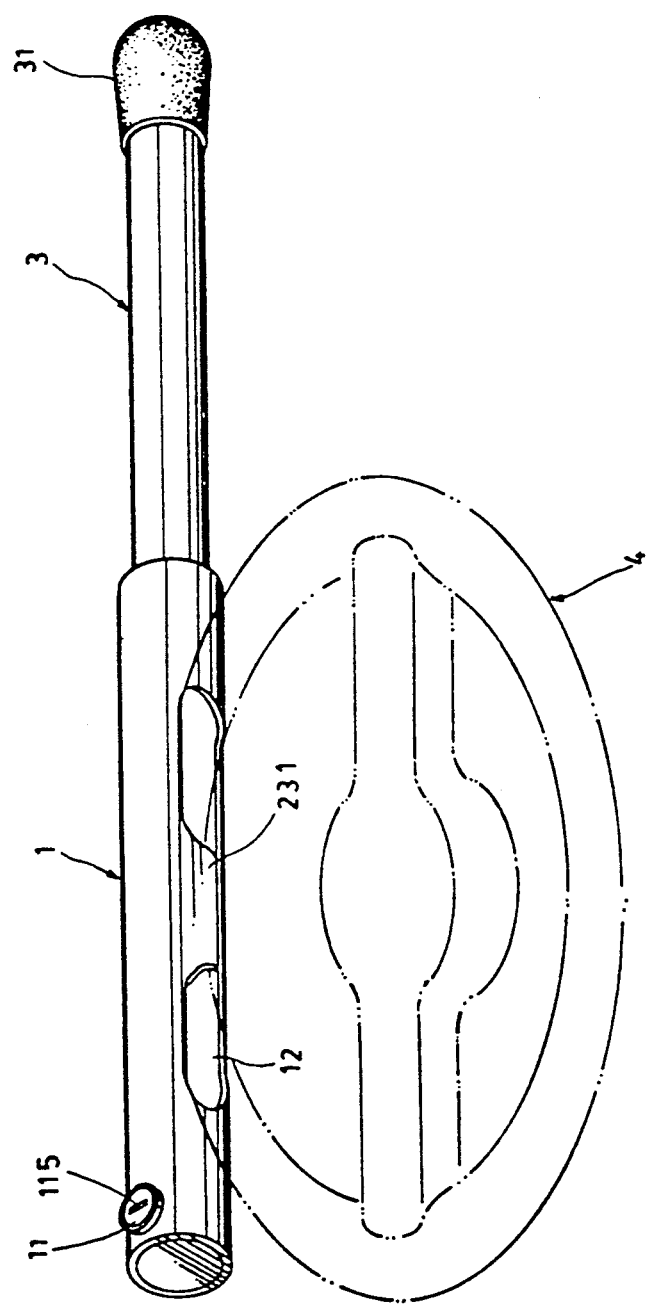
FIG. 4 illustrates that the steering lock of the present invention has been fastened position to lock up a steering wheel.

Referring to FIG. 4, the steering lock can be conveniently fastened in a steering wheel and then locked in position. The driving bar 3 is drawn out of the lock barrel 2 and then, the casing 1 is attached to the steering wheel 4 with the elongated opening 12 engaged with the peripheral ring portion of the steering wheel 4. Then, rotate the driving bar 3 to drive the curved tongue 231 into the steering wheel 4 permitting the steering lock to be firmly retained to the steering wheel 4. Once the curved tongue 231 is hooked in the steering wheel 4, the bolt 112 is simultaneously inserted in the corresponding round hole 211 on the front cylindrical portion 21 of the lock barrel 2. Because the bolt 112 prohibits the lock barrel 2 from reverse rotation, the steering lock is locked in position and can not be removed from the steering wheel 4. Because the peripheral ring portion of the steering wheel is engaged in the casing 1, the driving bar 3 is restrained from moving inside the lock barrel 2. Unlocking procedure is also simple. Inserting the key in the keyway 115 to rotate the spindle 111 causes the bolt 112 to move out of the front cylindrical portion 21. Once the bolt 112 is released from the front cylindrical portion 21, the return spring 223 automatically drives the lock barrel 2 to rotate backwards to its original unlocked position, i.e., the curved tongue 231 is removed out of the elongated opening 12 and the steering lock is removed from the steering wheel 4.

Figure 5:
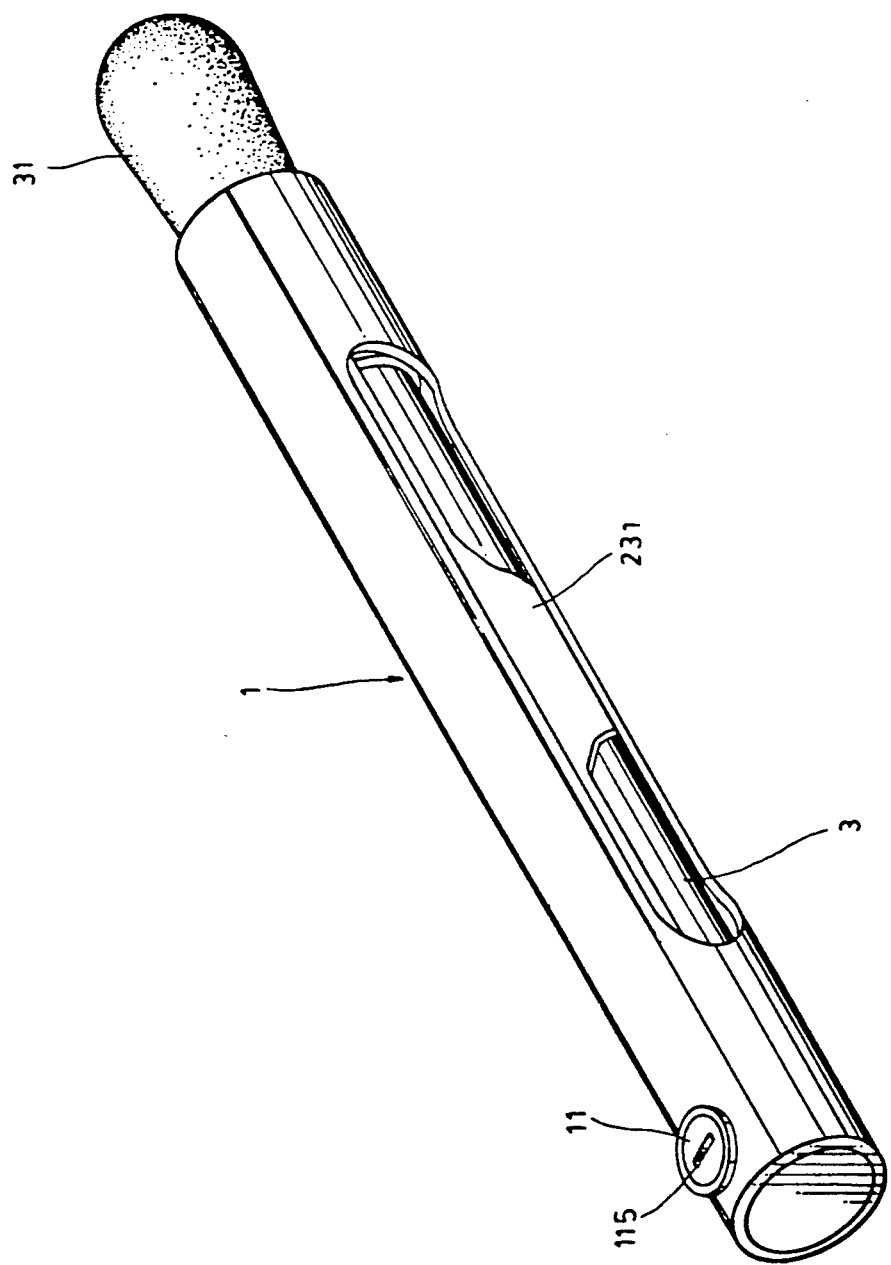
FIG. 5 is a perspective view of the present invention showing that the driving bar has been received inside the lock barrel and the casing present invention for storage.

Referring to FIG. 5, the driving bar 3 is received in the lock barrel 2 inside the casing 1 to reduce the size of the steering lock when it is not in use.

The invention has been described with respect to certain preferred embodiments, it would be readily understood that the preferred embodiments may be modified by the skilled artisan without departing from the spirit or scope of this invention. Accordingly, the invention is not to be construed as limited to the particulars to the preferred embodiments described above.

I claim:

1. A steering lock, comprising:
   a casing made from a tube having a closed end, an opposite open end, an inner wall and an outer wall, said casing having a lock cylinder fastened at the inner wall adjacent to the closed end thereof and an elongated opening on the outer wall thereof in a longitudinal direction;
   a lock barrel revolvably fastened in said casing, said lock barrel comprising a first cylindrical portion at one end, a second cylindrical portion at an opposite end and a side wall portion longitudinally connected between said first cylindrical portion and second cylindrical portion, said first cylindrical portion having a vertical end wall disposed adjacent to said lock cylinder, said vertical end wall having a periphery and a plurality of round holes around said periphery, said second cylindrical portion having a hole through an axis thereof and at least one tooth longitudinally projecting inwards, and said side wall portion having middle with a curved tongue projecting in a radical direction;
   a driving bar movably inserted in said lock barrel for rotating said lock barrel, said driving bar having a toothed portion at one end releasably engaged with said at least one tooth on said second cylindrical portion and a hand grip portion at an opposite end;
   wherein said side wall portion of said lock barrel is rotated by said driving bar to hook onto a peripheral ring portion of a motor vehicle steering wheel after said elongated opening on said casing has been attached thereto and then locked in position by said lock cylinder.

2. The steering lock as claimed in claim 1, wherein said second cylindrical portion of said lock barrel has an elongated groove on the outer wall thereof in a radial direction for holding a return spring, said return spring having one end fastened in said second cylindrical portion and an opposite end fastened in said casing to constantly drive said curved tongue of said elongated side wall portion out of said elongated opening.

3. The steering lock as claimed in claim 1, wherein said lock cylinder comprises a spindle linked to a keyway controlled by a key, a bolt longitudinally secured to said casing at the closed end thereof by a spring, said bolt having a sloping end driven by said spindle to move in or out of one of said round holes on said vertical end wall of said first cylindrical portion to thereby lock said lock barrel in position and to permit said lock barrel to freely rotate in a forward and a reverse direction.

* * * * *